May 31, 1932. M. F. WATERS 1,861,372
PIPE COUPLING
Filed Nov. 29, 1930
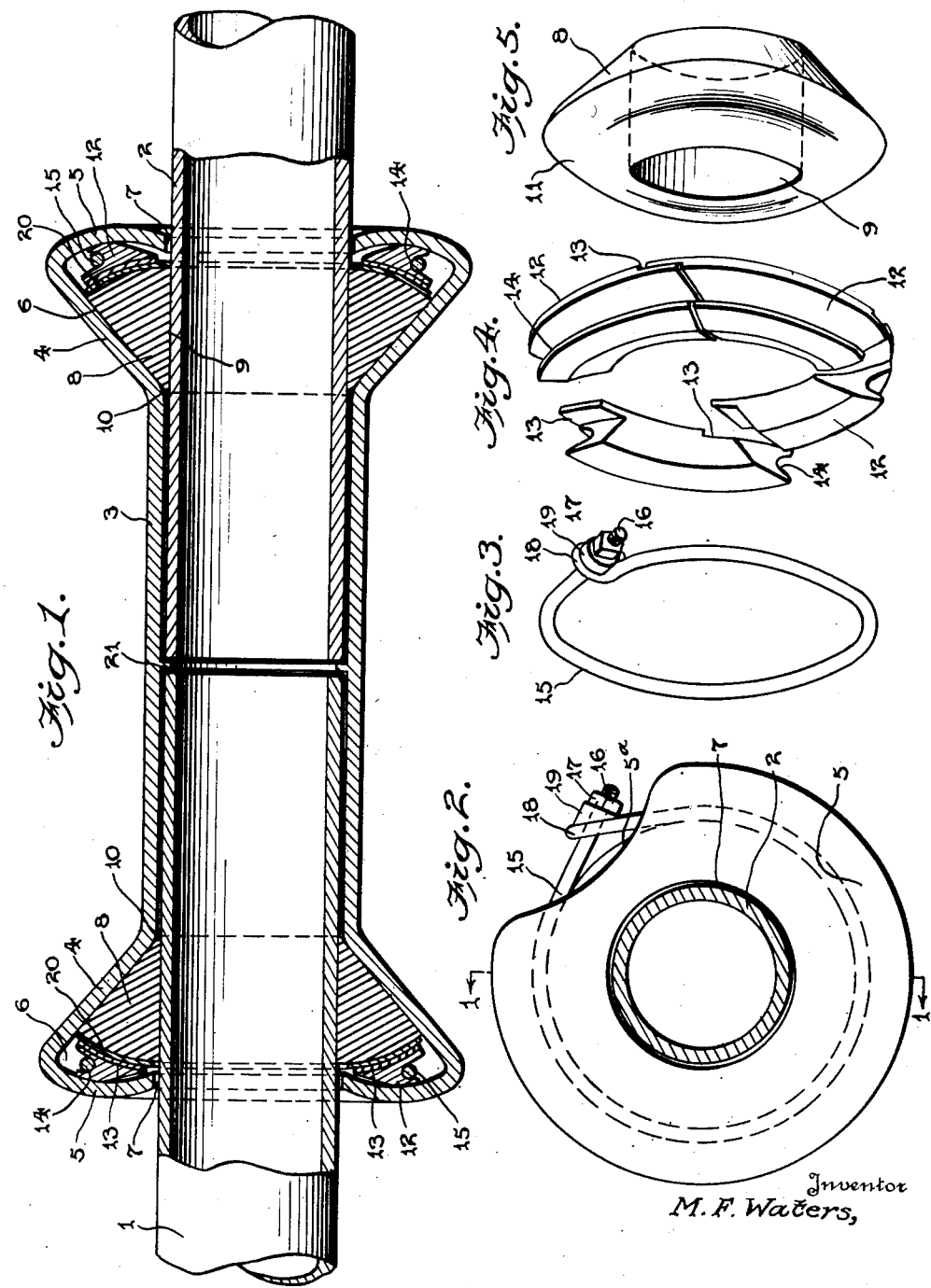
Inventor
M. F. Waters,
By George A. Prevost
Attorney Patented May 31, 1932

1,861,372

UNITED STATES PATENT OFFICE

MILLARD F. WATERS, OF TULSA, OKLAHOMA, ASSIGNOR TO HANLON-WATERS, INC., OF TULSA, OKLAHOMA

PIPE COUPLING

Application filed November 29, 1930. Serial No. 499,111.

My invention consists in new and useful improvements in pipe couplings and has for its object to provide a coupling which is comparatively simple in construction, easily applied, and one which may be employed in connection with any type of pipe, it being particularly adapted for use with plain end pipes, as, due to the improved structure of the same, all flanged and screw threaded connections are rendered unnecessary.

Another object of my invention is to provide an efficient coupling which may serve as an expansion joint, allowing for contraction and expansion of the sections of the pipe line, through the coupling.

Heretofore pipe couplings have required a plurality of nuts and bolts or screw threaded means of adjustment, each of which necessitated adjustment and tightening when the coupling was applied. This obviously failed to afford a uniformly sealed joint, due to the impossibility and uncertainty of the regularity of adjustment of the various bolts, etc.

It is therefore an object of my invention to overcome these disadvantages, and to this end I provide a coupling which requires a minimum number of adjusting elements for tightly sealing the packing means around the adjacent ends of the pipe sections, said adjusting elements comprising two annular bolts or adjusting bands each of which is adapted to be contracted radially to exert a uniform pressure on the sealing member which surrounds the pipe coupling.

Another feature of my invention which I consider novel and a decided advantage and contribution to the art, is the improved means for wedging the sealing members, and for transferring the radial movement of the adjusting means into a longitudinal wedging movement of the sealing means.

A still further object of my invention is to provide a pipe coupling and expansion joint, so constructed that the various parts may be completely assembled at the factory, and shipped out ready for immediate application, thus effecting a substantial saving in the installation costs.

With the above and other objects in view which will appear as the description proceeds, my invention consists in the novel features herein set forth, illustrated in the accompanying drawings, and more particularly pointed out in the appended claims.

Referring to the drawings in which numerals of like character designate similar parts throughout the several views, Fig. 1 is a longitudinal sectional view of the complete assembly, showing the relative positions of the various parts in connection with the adjacent ends of two pipe sections.

Fig. 2 is an end view of the assembly, showing the means of access to the adjusting bolt.

Fig. 3 is a detail perspective view of the annular adjusting bolt or band.

Fig. 4 is a perspective view, showing the sectional telescoping sealing ring follower with one of the sections displaced, and, Fig. 5 is a perspective view of the sealing ring itself.

In the drawings, 1 and 2 represent two adjacent sections of a conventional pipe line, arranged in end to end relation with their adjacent extremities slightly spaced apart. 3 represents the coupling housing which is constructed of any suitable metal and is cylindrical in shape for a greater portion of its length, its extremities being flared outwardly at a predetermined angle as at 4, and terminating in inwardly extending rounded end walls 5, forming a sealing chamber 6 at each end of the housing. The end walls 5 are provided with central annular openings 7 to receive the ends of the pipe sections 1 and 2, and are provided with cut-out portions 5a (Fig. 2) to permit access to the adjusting means hereinafter described.

8 designates sealing rings which are located within each of the chambers 6 and are preferably composed of rubber or other suitable substantially resilient material. These rings 8 are centrally apertured as at 9 to fit closely around the pipe sections 1 and 2, their outer walls being beveled or inclined to correspond with the angle of the flared walls 4 of the chambers 6, thus forming annular wedges, the inner extremities of which form entering edges which are adapted to be tightly wedged between the pipe sections and the inner wall of the housing 3, as at 10.

The opposite or outer ends 11 of the rings 8 are curved radially for the purpose hereinafter set forth and are spaced apart from the end walls 5 a sufficient distance to receive sealing ring followers 12. The followers 12 are annular in shape and are made up of a plurality of segments or sections, the adjacent ends of which are recessed complementary to each other and arranged in overlapping relation as at 13, Fig. 4, whereby the sections may be telescoped and drawn together as will be hereinafter set forth. The sections of the follower 12 are substantially V-shaped in lateral cross section as shown in Fig. 1, their peripheries being grooved as at 14 to receive an annular adjusting bolt or band 15, the inner faces of said follower sections being curved to correspond with the curve of the outer extremities of the sealing rings 8, and their outer faces being shaped to engage the adjacent walls 5 of the sealing chambers 6 to allow for a wedging action between said walls and the outer curved extremities 11 of the rings 8, when said follower sections are contracted by the bolts or bands 15.

The annular bolt 15 encircles the groove 14 in each of the followers 12 and is threaded at one end 16 to receive a nut 17, the other end of said annular bolt being bent to form a loop 18 which surrounds the threaded end adjacent the threads 16. In order to provide a flat surface upon which the nut 17 may act in tightening the bolt 15, I employ a suitable lug 19 which is beveled at one side adjacent the loop 18 and is adapted to be interposed between said loop and the nut 17. This lug may be a separate element or it may be made a part of the loop end 18 of the annular bolt.

In order to insure the free action of the adjusting elements, I preferably employ a relatively thin annular strip or ring 20 of soft metal, hard rubber, or heavy fabric, between the adjacent faces of the followers 12 and the rings 8. Otherwise, there would be a likelihood of friction between the rubber of the ring and the metal of the follower which would tend to retard the wedging action.

Having thus described the construction and assembly of my improved pipe coupling, its operation is as follows:—

The ends of the pipe sections are inserted through the apertures 7 in the end walls 5 of the housing and are moved longitudinally inwardly until they abut the spacing or centering ring 21 located centrally within the cylindrical portion of the housing 3, the purpose of this ring, obviously, being to indicate when the pipe sections have reached the central portion of the housing. The pipe sections are then preferably withdrawn a slight distance from the ring 21 to allow for a slight longitudinal movement by expansion and contraction.

The adjusting and wedging means, having been already assembled when leaving the factory, are now ready for adjustment. The nut 17 is tightened on the threaded end 16 of each of the annular bolts or bands 15, the latter lying within the groove 14 of the follower 12. The contraction of the bolt 15 causes a uniform radial contraction and telescoping of the segments of the follower 12, which in turn effects a wedging action between the sealing ring 8 and the wall 5 of the chamber 6, causing the sealing ring to be moved longitudinally inwardly along the pipe sections, its inner beveled extremity, wedging tightly between the pipe section and the inner surface of the angular wall 4 at its point of intersection with the cylindrical portion of the housing 3, securely sealing this point against leakage.

It will be seen that with this arrangement a double wedging action takes place, namely, between the follower and the sealing ring, and between the sealing ring and the wall of the coupling housing, thus affording a maximum leverage and insuring a perfectly sealed joint.

It will also be noted that due to the telescoping action of the segments of the follower 12, through the medium of the annular bolt 15, a uniform contraction and longitudinal wedging movement of the sealing ring 8 is developed, which insures a uniformly sealed joint as opposed to the various pipe couplings heretofore known which employ a plurality of tightening members which are not simultaneously operated.

From the foregoing it is believed that the advantages and operation of my invention may be readily understood by those skilled in the art without further description, it being borne in mind that numerous changes may be made in the details of construction without departing from the spirit of the invention as set out in the following claims.

What I claim and desire to secure by Letters Patent is:—

1. A pipe coupling including a housing terminating at at least one end in a gradually expanding annular chamber closed at its outer extremity by an end wall, the latter being centrally apertured to receive a section of pipe, an annular ring in said chamber surrounding said pipe, one side of said ring tapering to a thin entering edge, an annular follower, substantially wedge shaped in cross-section from its periphery toward its inside diameter, means for radially contracting said follower into wedging engagement between the end wall of said chamber and said sealing ring, whereby the latter is in turn, longitudinally wedged between said pipe section and the expanding wall of said chamber.

2. A pipe coupling as claimed in claim 1, wherein said follower is composed of telescoping sections, its periphery being grooved, an annular bolt adapted to encircle said groove, and adjusting means for radially contracting said bolt to telescope said sections.

3. In combination with a section of pipe, a pipe coupling including a housing terminating at at least one end in a chamber having diverging side walls and an end wall, a wedge ring encircling said pipe within said chamber, a contractable follower arranged in said chamber between the end wall thereof and said ring, and means for contracting said follower and simultaneously moving said ring longitudinally into wedging engagement with said pipe and the diverging walls of said chamber.

4. A pipe coupling comprising a housing forming an annular chamber, a sealing ring in said chamber, wedge means for moving said ring longitudinally within said chamber into sealing engagement with a section of pipe, and radially contractable means for bringing said wedge means into play.

5. A pipe coupling comprising a housing forming an annular expanding chamber, a sealing ring in said chamber, one side of which tapers into a thin entering edge, wedge means engaging the other side of said ring for moving the latter longitudinally within the chamber into sealing engagement with a section of pipe, a radially contractable band carried by said wedge means for bringing the latter into play.

6. A pipe coupling comprising a housing terminating at at least one end in a gradually expanding chamber, an annular sealing ring in said chamber, one side of which tapers into a thin entering edge, a radially contractable wedge ring engaging the opposite side of said sealing ring, and a radially contractable band carried by said wedge ring for bringing the latter into play to wedge the entering edge of said sealing ring between the periphery of a section of pipe and the expanding wall of said chamber.

7. In a pipe coupling including a housing, sealing means, comprising an annular sealing ring of compressible material, one side of which tapers to a thin entering edge, a peripherally grooved sectional wedge ring engaging the opposite side of said sealing ring, the adjacent extremities of the sections of said wedge ring being arranged in overlapping relation, and a radially contractable band adapted to lie within said peripheral groove for telescoping the sections of said wedge ring around a pipe to wedge the entering edge of said sealing ring between said pipe and the wall of said housing.

8. A pipe coupling as claimed in claim 4 wherein said last named means comprises an annular bolt, threaded at one end, its other end terminating in a loop which encircles said threaded end adjacent the threads, a nut for said threaded end, and a lug interposed between said loop and said nut to provide an engaging surface for said nut.

In testimony whereof I affix my signature.

MILLARD F. WATERS.